United States Patent
Bushman et al.

(10) Patent No.: US 8,195,227 B1
(45) Date of Patent: Jun. 5, 2012

(54) OPTICAL IMAGE PROCESSING FOR IMAGE SET DECODING FROM A WIRELESS COMMUNICATION DEVICE

(75) Inventors: Serge J. L. Bushman, Overland Park, KS (US); Michael Gailloux, Overland Park, KS (US); Carl Joseph Persson, Olathe, KS (US); Thomas Henry Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 663 days.

(21) Appl. No.: 12/275,283

(22) Filed: Nov. 21, 2008

(51) Int. Cl.
*H04M 1/00* (2006.01)

(52) U.S. Cl. ............... 455/556.1; 455/557; 455/566; 455/414.1; 398/28; 398/38

(58) Field of Classification Search ............... 455/556.1, 455/557, 414.1, 566; 398/28, 38
See application file for complete search history.

(56) References Cited

U.S. PATENT DOCUMENTS

| | | | |
|---|---|---|---|
| 6,203,069 B1 | 3/2001 | Outwater et al. | |
| 6,264,106 B1 | 7/2001 | Bridgelall | |
| 6,513,017 B1 | 1/2003 | Howard et al. | |
| 6,816,075 B2 | 11/2004 | Grunes et al. | |
| 6,947,571 B2 | 9/2005 | Rhoads et al. | |
| 6,961,555 B1 | 11/2005 | Philyaw | |
| 6,993,573 B2 | 1/2006 | Hunter | |
| 7,068,170 B2 | 6/2006 | Green | |
| 7,121,469 B2 | 10/2006 | Dorai et al. | |
| 7,181,066 B1 | 2/2007 | Wagman et al. | |
| 7,190,835 B2 | 3/2007 | Durbin et al. | |
| 7,222,791 B2 | 5/2007 | Heilper et al. | |
| 7,229,021 B2 * | 6/2007 | Vesikivi et al. | 235/462.01 |
| 7,274,931 B2 | 9/2007 | Harris | |
| 7,287,696 B2 * | 10/2007 | Attia et al. | 235/462.01 |
| 7,523,866 B2 | 4/2009 | Longacre, Jr. et al. | |
| 7,634,065 B2 | 12/2009 | Fukunaga et al. | |
| 2001/0056359 A1 | 12/2001 | Abreu | |
| 2002/0052211 A1 | 5/2002 | Kim et al. | |
| 2002/0078363 A1 | 6/2002 | Hill et al. | |
| 2003/0156032 A1 | 8/2003 | Adams et al. | |
| 2003/0229678 A1 | 12/2003 | Wen et al. | |
| 2003/0233432 A1 | 12/2003 | Davis et al. | |
| 2004/0145613 A1 | 7/2004 | Stavely et al. | |

(Continued)

FOREIGN PATENT DOCUMENTS

EP 0645728 3/1995

(Continued)

OTHER PUBLICATIONS

Jan Harris, "Accelerometers Could Enhance Camera Phone Pictures," Camera Core, Mar. 23, 2007, 3 pages, camera-core.co.uk, http://www.camera-core.co.uk/23-03-2007-accelerometers-could-enhance-camera-phones-pictures.html.

(Continued)

*Primary Examiner* — Temica M Beamer

(57) ABSTRACT

An image encodes processing parameters for a set of images. A wireless communication device optically receives and processes the received image to generate first image data. The image data represents the processing parameters. The wireless communication device processes the first image data to obtain the processing parameters. The wireless communication device then optically receives the set of images. The set of images encode second image data. The wireless communication device processes the optically received set of images based on the processing parameters to obtain second image data.

20 Claims, 7 Drawing Sheets

U.S. PATENT DOCUMENTS

| | | | |
|---|---|---|---|
| 2004/0153553 | A1 | 8/2004 | Chotkowski et al. |
| 2005/0011957 | A1 | 1/2005 | Attia et al. |
| 2005/0029354 | A1 | 2/2005 | Frantz et al. |
| 2005/0044179 | A1 | 2/2005 | Hunter |
| 2005/0080681 | A1 | 4/2005 | Ohnishi |
| 2005/0173524 | A1 | 8/2005 | Schrader |
| 2006/0002591 | A1 | 1/2006 | Hombo |
| 2006/0020614 | A1 | 1/2006 | Kolawa et al. |
| 2006/0026048 | A1 | 2/2006 | Kolawa et al. |
| 2006/0042139 | A1 | 3/2006 | Mendes |
| 2006/0100925 | A1 | 5/2006 | Finaly |
| 2006/0212938 | A1 | 9/2006 | Suzuki |
| 2007/0061242 | A1 | 3/2007 | Ramer et al. |
| 2007/0061243 | A1 | 3/2007 | Ramer et al. |
| 2007/0061303 | A1 | 3/2007 | Ramer et al. |
| 2007/0083381 | A1 | 4/2007 | Farrell et al. |
| 2007/0133567 | A1 | 6/2007 | West et al. |
| 2007/0150588 | A1 | 6/2007 | Ghadialy et al. |
| 2007/0290045 | A1 | 12/2007 | Cisar |
| 2007/0290499 | A1 | 12/2007 | Tame |
| 2008/0254775 | A1* | 10/2008 | Rohs .................. 455/414.1 |
| 2009/0086045 | A1 | 4/2009 | Giebel et al. |
| 2009/0242620 | A1* | 10/2009 | Sahuguet .................. 235/375 |
| 2010/0041968 | A1 | 2/2010 | Meschisen et al. |

FOREIGN PATENT DOCUMENTS

| | | |
|---|---|---|
| JP | 2008090512 | 4/2008 |
| WO | WO-2006107610 | 10/2006 |

OTHER PUBLICATIONS

Livecycle, "Using Barcode Data in Processes," LiveCycle Workbench ES Help, Nov. 20, 2008, 3 pages, LiveCycle, http://livedocs.adobe.com/livecycle/es/wb_help/wwhelp/wwhimpl/common/html/wwhelp.htm?context=Workbench_ES&file=00001152.html.

Pegasus Imaging Corporation, "Using Barcodes in Documents—Best Practices," Barcode Basics, 2007, pp. 1-9, Pegasus Imaging Corporation, http://www.pegasusimaging.com/BarcodesinDocuments-BestPractices.pdf.

Popular Electronics, "Nokia N82 Unlocked Quad Band GSM 5+ Megapixel Camera Cell Phone," Nov. 21, 2008, 3 pages, Popular Electronics, http://www.popularelect.com/product_info.php?products_id=875&osCsid=d9b4eb6c7150c354f9fc573c748b2c06.

Popular Electronics, "Apple Unlocked GSM Cell Phone," Nov. 21, 2008, 3 pages, Popular Electronics, http://www.popularelect.com/index.php?cPath=21_62.

Jewels ET Jim, "Fashionable Medical I.D. Jewelry," May 8, 2008, 1 page, http://www.jewelsetjim.com/.

Projectresponder.com, "Medical Alert Bracelet," May 8, 2008, 3 pages, http://www.projectresponder.com/medical-alert-bracelet~139.htm.

Xiaoming Zhao, et al., "Integration of Information Technology, Wireless Networks, and Personal Digital Assistants for Triage and Casualty," Telemedicine and e-Health, Aug. 1, 2006, 2 pages, vol. 12, No. 4, Mary Ann Liebert, Inc., New Rochelle, New York, http://www.liebertonline.com/doi/abs/10.1089/tmj.2006.12.466?cookieSet=1&journalCode=tmj.

USPTO Office Action Summary dated Nov. 23, 2010 from U.S. Appl. No. 12/043,239.

* cited by examiner

OPTICAL IMAGE PROCESSING FOR IMAGE SET DECODING FROM A WIRELESS COMMUNICATION DEVICE

TECHNICAL BACKGROUND

Images are capable of encoding many different types of information. An example of these images are traditional one and two-dimensional barcodes. Although, they are most commonly used for goods on store shelves, shipping companies use barcodes to keep track of packages and shipping information. Depending on the type of encoding, a barcode can encode letters, numbers, characters, or digital data. The amount of data a single barcode can encode is simply limited by its size and density. Multiple images can then be used to increase the amount and diversity of information that can be stored. However, there is no system to selectively process a set of images to separate out the images with desired information from those with undesired information.

Overview

An image encodes processing parameters for a set of images. A wireless communication device optically receives and processes the received image to generate first image data. The image data represents the processing parameters. The wireless communication device processes the first image data to obtain the processing parameters. The wireless communication device then optically receives the set of images. The set of images encode second image data. The wireless communication device processes the optically received set of images based on the processing parameters to obtain second image data.

DETAILED DESCRIPTION

Figure 1:
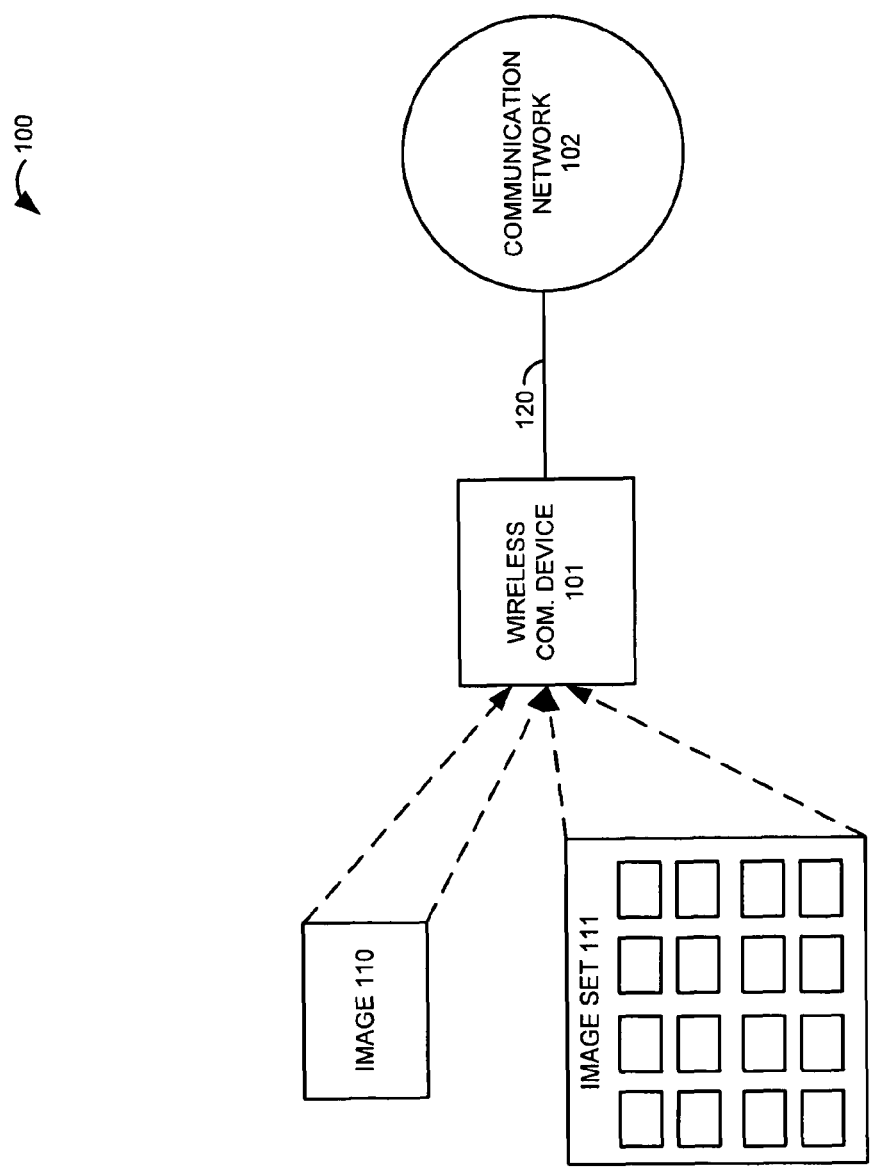
FIG. 1 is a block diagram that illustrates a wireless communication system.

FIG. 1 is a block diagram that illustrates wireless communication system 100. Wireless communication system 100 comprises wireless communication device 101, communication network 102, image 110, and image set 111. Examples of image 110 include a one-dimensional barcode, a two-dimensional barcode, or any other optically receivable image capable of encoding data. Image 110 may be displayed on an electronic display such as a computer monitor. Examples of image set 111 include one-dimensional barcodes, two-dimensional barcodes, a combination of one and two-dimensional barcodes, or a set of any other optically receivable images capable of encoding data. Image set 111 may be displayed on an electronic display such as a computer monitor.

Wireless communication device 101 optically receives image 110 and image set 111 as indicated on FIG. 1 by dashed lines. Wireless communication device 101 and communication network 102 wirelessly exchange communications over wireless link 120.

Wireless communication device 101 comprises a telephone, transceiver, computer, digital assistant, mobile Internet access device, or some other wireless communication apparatus—including combinations thereof. Wireless communication device 101 has a camera or some other optical receiver.

Communication network 102 comprises wireless access points, telephony switches, Internet routers, network gateways, computer systems, communication links, or some other type of communication equipment—including combinations thereof. Wireless link 120 uses air or space as the transport media. Wireless link 120 could use various protocols, such as wireless fidelity, code division multiple access, worldwide interoperability for microwave access, global system for mobile communications, long term evolution, internet, telephony, or some other communication format—including combinations thereof.

Figure 2:
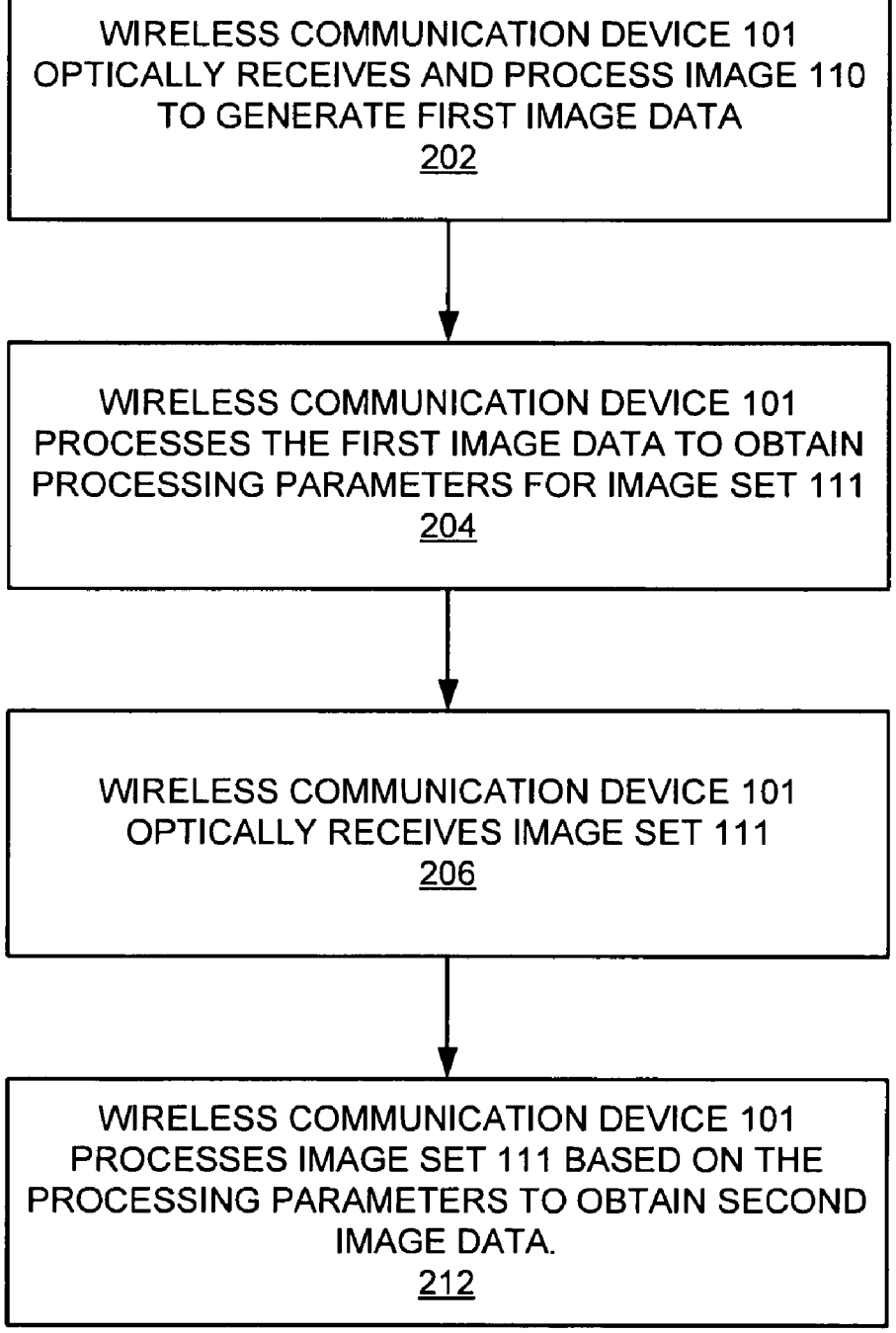
FIG. 2 is a flow diagram that illustrates the operation of the wireless communication system.

FIG. 2 is a flow diagram that illustrates the operation of wireless communication system 100. The operation starts when wireless communication device 101 optically receives and processes image 110 to generate first image data (202). The optical reception and processing of image 110 could be automatic or be responsive to a human input. For example, the user may operate a user interface to direct wireless communication device 101 to take a picture of image 110 and process the received image. Wireless communication device 101 processes the first image data to obtain processing parameters for image set 111 (204). Image data processing could be responsive to a user input or automatic in response to optical reception and processing of the image.

Wireless communication device optically receives image set 111 (206) and processes image set 111 based on the processing parameters to obtain second image data (212). Optically receiving image set 111 may be accomplished by receiving a single image of the entire image set or by making a video sweep of the images in image set 111. The optical reception and processing of image set 111 could be automatic or be responsive to a human input. For example, the user may operate a user interface to direct wireless communication device 101 to take a picture of image set 111 and process the received image set.

In the above example, the processing parameters may include many different instructions for optically receiving and processing image set 111. For example, more than one set of images may exist. The processing parameters may include instructions indicating which image set to optically receive. Wireless communication device 101 may then indicate to the user that image set 111 is the image set to be optically received. The processing parameters may also indicate that only a subset of image set 111 should be received and processed. Wireless communication device 101 may itself be able to separate out the subset or wireless communication device 101 may indicate to the user that the user should capture specific images within image set 111. Additionally, the processing parameters may include a decryption code for decrypting the second image data, a URL to which wireless communication device 101 transmits the second image data over link 120 and communication network 102, instructions to execute an application that further processes the second image data, or any other information that may be pertinent in processing image set 111.

Figure 3:
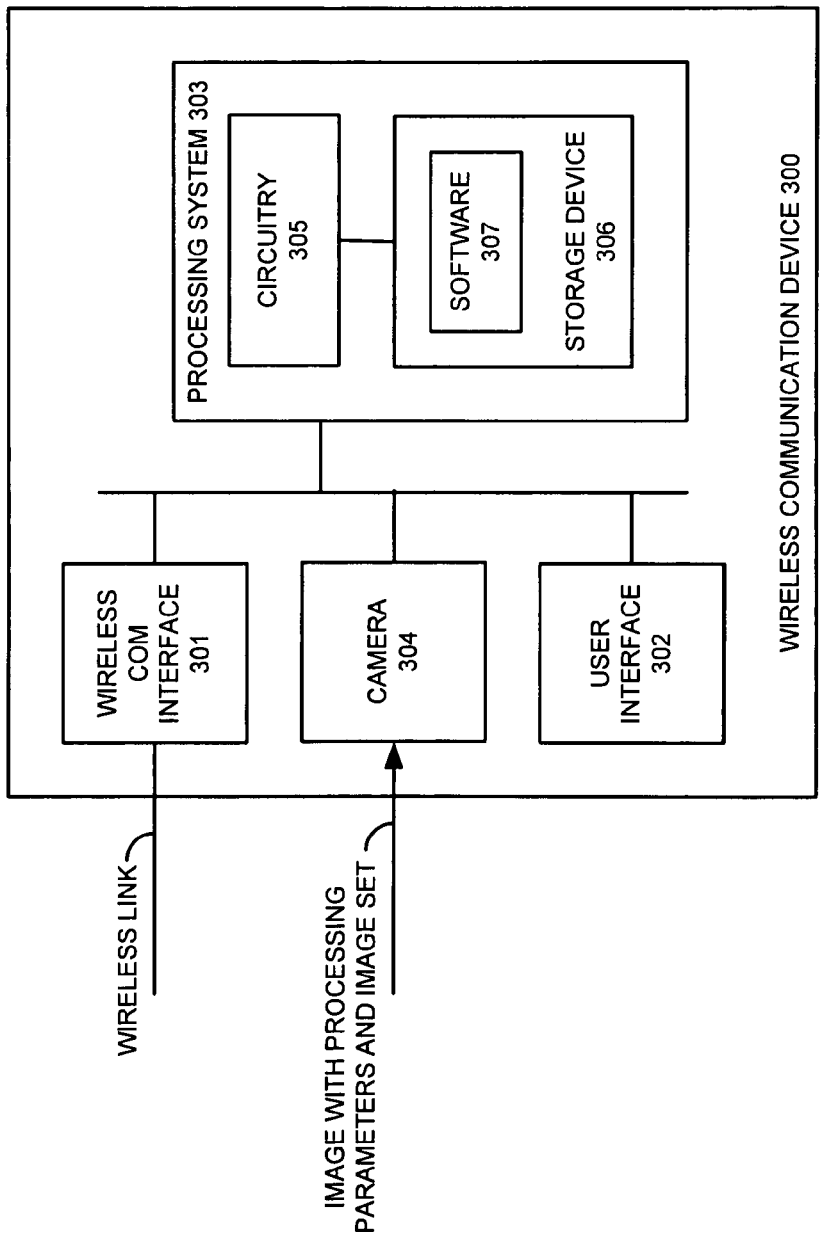
FIG. 3 is a block diagram that illustrates a wireless communication device.

FIG. 3 is a block diagram that illustrates wireless communication device 300 that provides image set decoding. Wireless communication device 300 is an example of wireless communication device 101, although wireless communications device 101 may use alternative configurations. Wireless communication device 300 comprises wireless communication interface 301, user interface 302, processing system 303, and camera 304. Processing system 303 is linked to wireless communication interface 301, user interface 302, and camera 304. Processing system 303 includes circuitry 305 and storage device 306 that stores operating software 307.

Wireless communication interface 301 comprises components that communicate over a wireless link under the control of processing system 303. Wireless communication interface 301 comprises an RF transceiver and antenna or some other wireless communication device. User interface 302 comprises components that interact with the user under the control of processing system 303. User interface 302 may include a speaker, microphone, buttons, lights, display screen, touch screen, touch pad, scroll wheel, or some other user input/output apparatus. Circuitry 305 comprises microprocessor and other circuitry that retrieves and executes operating software 307 from storage device 306 to control wireless communication interface 301, user interface 302, and camera 304. Storage device 306 comprises a disk drive, flash drive, memory circuitry, or some other memory device.

Operating software 307 comprises computer programs, firmware, or some other form of machine-readable processing instructions. Operating software 307 may include an operating system, utilities, drivers, network interfaces, applications, or some other type of software. When executed by circuitry 305, operating software 307 directs processing system 303 to operate wireless communication device 300 as described herein. In particular, operating software 307 directs processing system 303 to perform the image receiving and processing as described herein.

Camera 304 is configured to optically receive images, convert the optical image into image data, and transfer the image data to processing system 303. Camera 304 operates in response to instructions from processing system 303. For example, the user may provide camera instructions through user interface 302, and in response, processing system 303 would direct camera to optically capture an image and provide the resulting image data to processing system 303. Camera 304 could be a wireless telephone camera or some other optical receiver.

Figure 4:
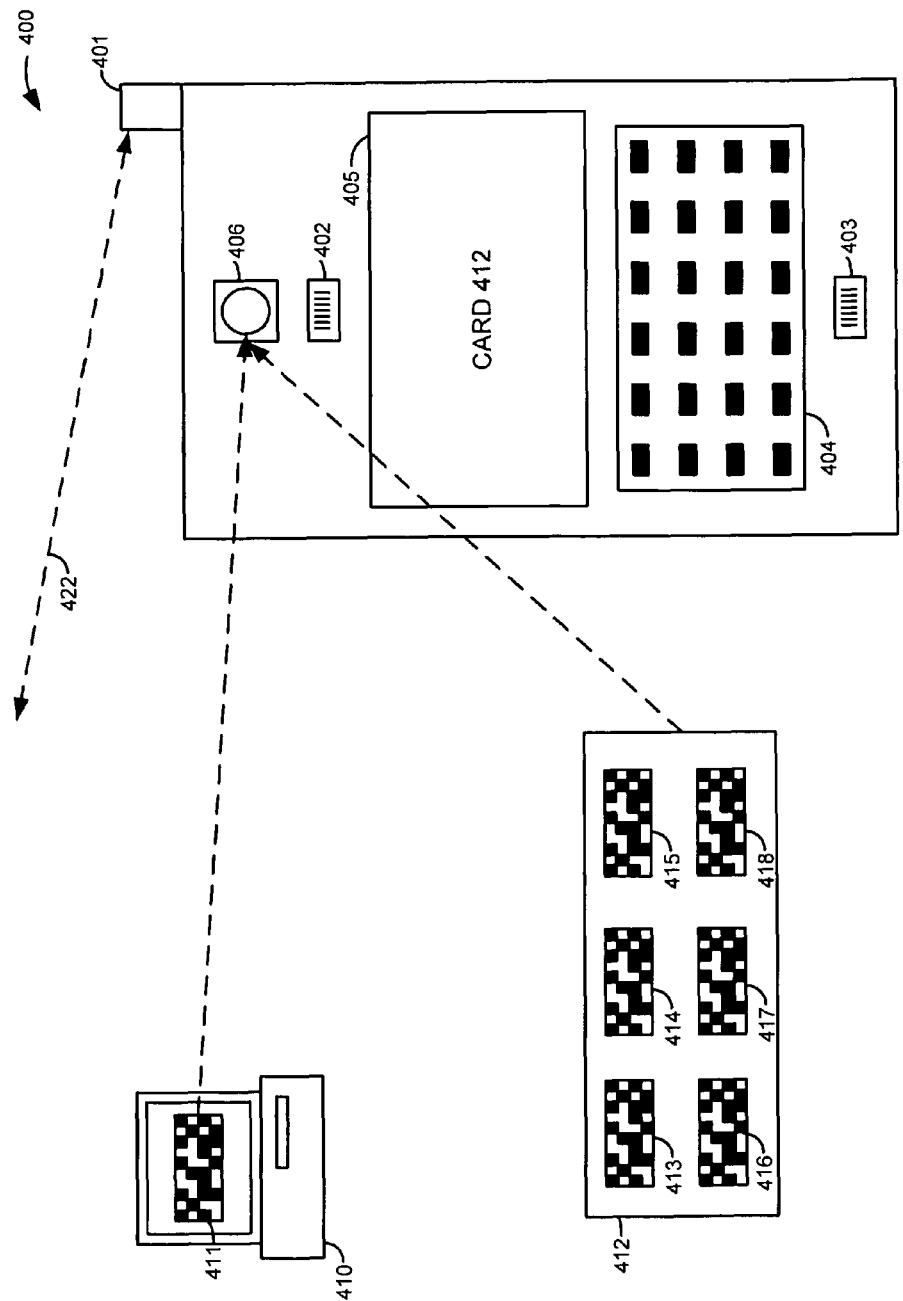
FIG. 4 is a sketch that illustrates a wireless telephone providing image processing in an order-processing context.

FIG. 4 is a sketch that illustrates a wireless telephone providing image processing in an order-processing context. Wireless telephone 400 includes antenna 401, speaker 402, microphone 403, keypad 404, display 405, and camera 406. Wireless telephone 400 communicates with a wireless communication network over wireless link 422. Two-dimensional barcode 411 is displayed on computer monitor 410. Two-dimensional barcodes 413-418 are displayed on card 412.

In this example, the user of wireless telephone 400 is a worker at an online store. The online store sells many different gift packages. When the store receives an order through its website, computer monitor 410 displays two-dimensional barcode 411. The worker operates wireless telephone 400 to take a picture of two-dimensional barcode 411 displayed on computer monitor 410. Two-dimensional barcode 411 encodes information about the gift package that the worker needs to assemble and ship. The information indicates the shipping address for the gift package, that the package needs to be shipped overnight, the website for the shipping company, that the gift package on card 412 was ordered, and that no extra items were included in the order. Wireless telephone 400 processes two-dimensional barcode 411 to produce corresponding image data having the gift package information.

Wireless telephone 400 displays that card 412 contains the rest of the information needed for assembly of the gift package. The worker operates wireless telephone 400 to take a picture of card 412. Barcode 413 encodes the contents of the gift package. Barcode 414 encodes that the gift package should be placed in a 24×24×15 foam box for shipping. Barcodes 415-418 encode extra items that could be included with the gift package at the customers request. The processing parameters indicate that the customer has ordered no extras for the package. Therefore, the processing parameters instruct wireless telephone 400 to process only two-dimensional barcodes 413 and 414 because two-dimensional barcodes 415-418 encode the extra items that were not ordered.

The processing parameters further instruct wireless telephone 400 to display the contents of the gift package encoded in two-dimensional barcode 413 so the worker can assemble the gift package. The process parameters then instruct wireless telephone 400 to display that the gift package should be packed in a 24×24×15 box with foam peanuts for shipping, as is encoded in two-dimensional barcode 414. Finally, the processing parameters instruct wireless telephone 400 to transmit a notification to the shipping company's web site indicating that there is a package ready for pickup and that it needs to be shipped overnight.

Figure 5:
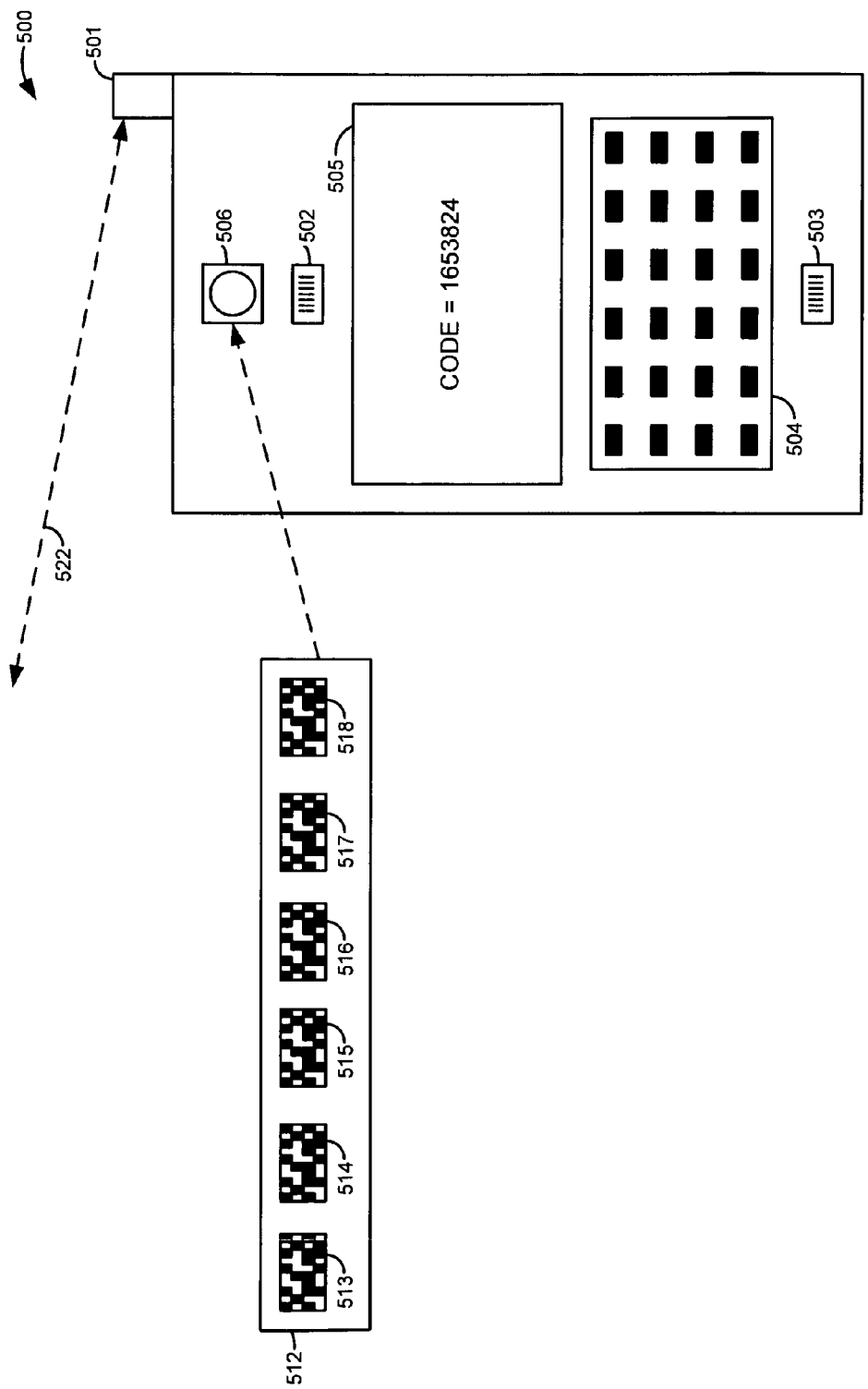
FIG. 5 is a sketch that illustrates a wireless telephone providing image processing in a secured building access context.

FIG. 5 is a sketch that illustrates a wireless telephone providing image processing in a secured building access context. Wireless telephone 500 includes antenna 501, speaker 502, microphone 503, keypad 504, display 505, and camera 506. Wireless telephone 500 communicates with a wireless communication network over wireless link 522. Two-dimensional barcodes 513-518 are displayed on placard 512. Placard 512 is affixed to a wall next to a pass code locked door.

In this example, an authorized person named Dave needs access through the pass-coded door. Dave operates wireless telephone 500 to make a video sweep of two-dimensional barcodes 513-518 on placard 512. The video sweep first captures two-dimensional barcode 513. Two-dimensional barcode 513 encodes processing parameters with information about which of the other barcodes on placard 512 should be processed, the decryption code for the other barcodes, and the URL for a pass code server. Wireless telephone 500 processes two-dimensional barcode 513 to produce corresponding image data containing the processing parameters. The processing parameters indicate to wireless telephone 500 that only two-dimensional barcodes 514 and 517 should be processed.

As the video sweep continues across placard 512, wireless telephone 500 processes two-dimensional barcodes 514 and 517 and does nothing with two-dimensional barcodes 515, 516, and 518. Two-dimensional barcodes 514 and 517 encode encrypted information needed to obtain the pass code for the door. Wireless telephone 500 decrypts the information on two-dimensional barcodes 514 and 517 using the decryption code supplied in the processing parameters to obtain an authorization code. Wireless telephone 500 transmits the authorization code to the pass code server defined in the processing parameters. Wireless telephone 500 receives pass code "1653824" from the pass code server and displays the pass code on display 505. Dave types the pass code into the doors keypad and the door unlocks.

Figure 6:
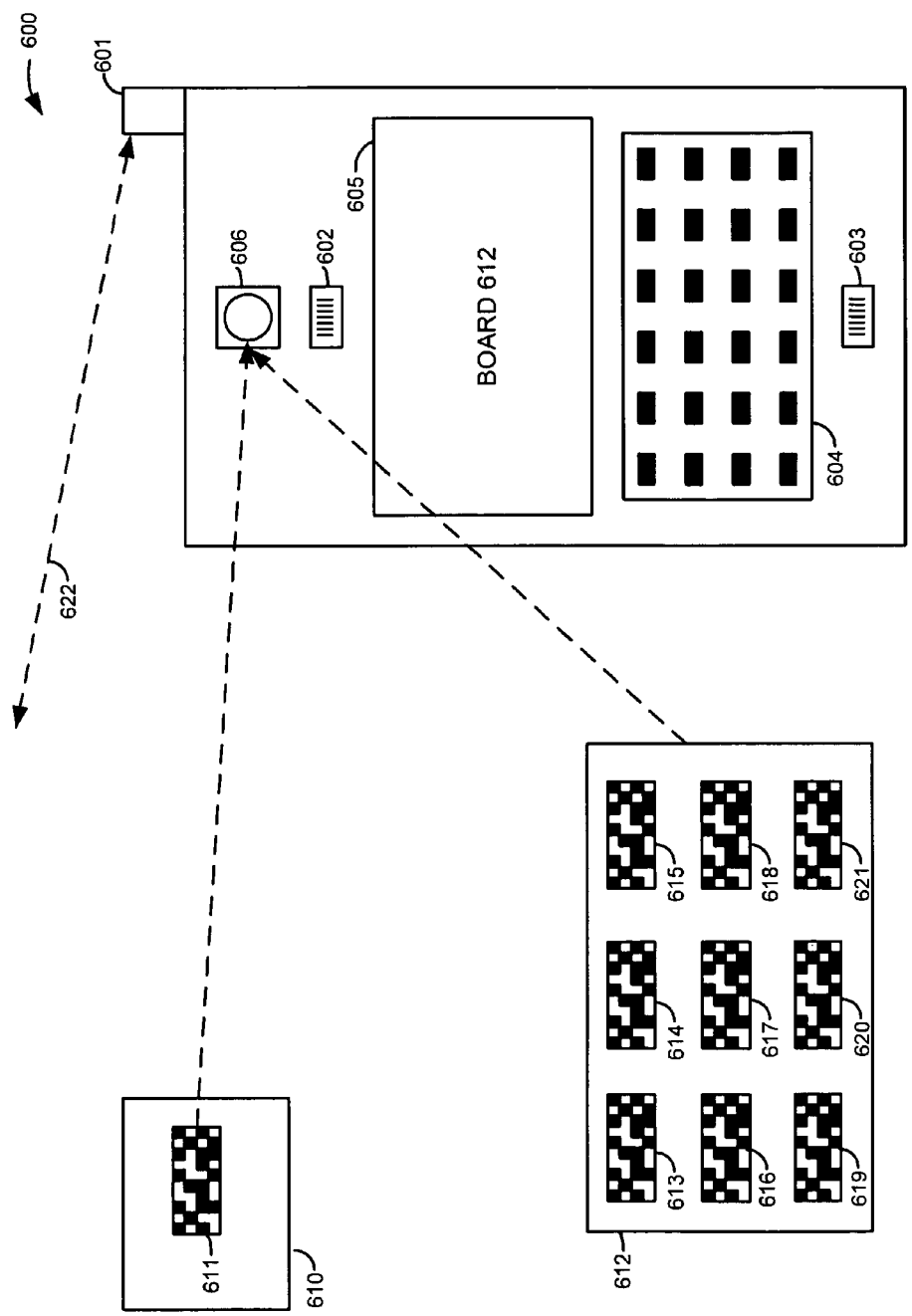
FIG. 6 is a sketch that illustrates a wireless telephone providing image processing in a job assignment context.

FIG. 6 is a sketch that illustrates a wireless telephone providing image processing in a job assignment context. Wireless telephone 600 includes antenna 601, speaker 602, microphone 603, keypad 604, display 605, and camera 606. Wireless telephone 600 communicates with a wireless communication network over wireless link 622. Two-dimensional barcode 611 is displayed on postcard 610. Two-dimensional barcodes 613-621 are displayed on bulletin board 612.

In this example, Becky is a volunteer for a political campaign that likes to get voters' attention by performing crazy advertising stunts. The campaign does not want anyone to know what the stunt is going to be before the time comes to execute the stunt. The campaign also does not want volunteers to figure out amongst each other what the stunt is until the time comes to execute the stunt. A few days before the stunt is scheduled to take place, the campaign mails postcards to campaign volunteers. Becky receives postcard 610. Two-dimensional barcode 611 is printed on postcard 610. Becky operates wireless telephone 600 to take a picture of two-dimensional barcode 611. Two-dimensional barcode 611 contains the processing parameters for a set of barcodes that Becky will find at the campaign's headquarters on the day of the stunt. The processing parameters include instructions for wireless telephone 600 to display bulletin board 612 on the day of the stunt, instructions for the wireless telephone to capture and process two-dimensional barcodes 613, 618, and 620, the decryption code for the two-dimensional barcodes, and a URL for the campaign's coordination server. Wireless telephone 600 processes two-dimensional barcode 611 to produce corresponding image data having the processing parameters.

On the day of the stunt Becky arrives at the campaign's headquarters to find multiple bulletin boards set up in a room. Becky looks at wireless telephone 600 to find bulletin board 612 displayed in accordance with the processing parameters. Becky operates wireless telephone 600 to take a picture of bulletin board 612. Bulletin board 612 contains two-dimensional barcodes 613-621. Wireless telephone 600 decrypts and processes two-dimensional barcodes 613, 618, and 620 in accordance with the processing parameters. Two-dimensional barcode 613 encodes that Becky needs to go to $6^{th}$ and Elm Street. Barcode 618 encodes that Becky needs to bring 6 campaign signs and some rope. Barcode 620 encodes that Becky needs to talk to Bill when she gets to the location. Wireless telephone displays the information encoded in two-dimensional barcodes 613, 618, and 620.

Becky follows the instructions displayed on wireless telephone 600. She drives to $6^{th}$ and Elm with 6 campaign signs and rope. Becky finds Bill who gives her the final instructions. Becky indicates on wireless telephone 600 that she is in position and is ready to perform the stunt. Wireless telephone 600 transmits a message notifying the coordination server that Becky is ready. Once the coordination server receives ready notification messages from all the volunteers the coordination server transmits a message to wireless telephone 600 instructing it to display a message indicating to Becky that it is time to execute the stunt. Becky receives the message and executes the stunt.

Figure 7:
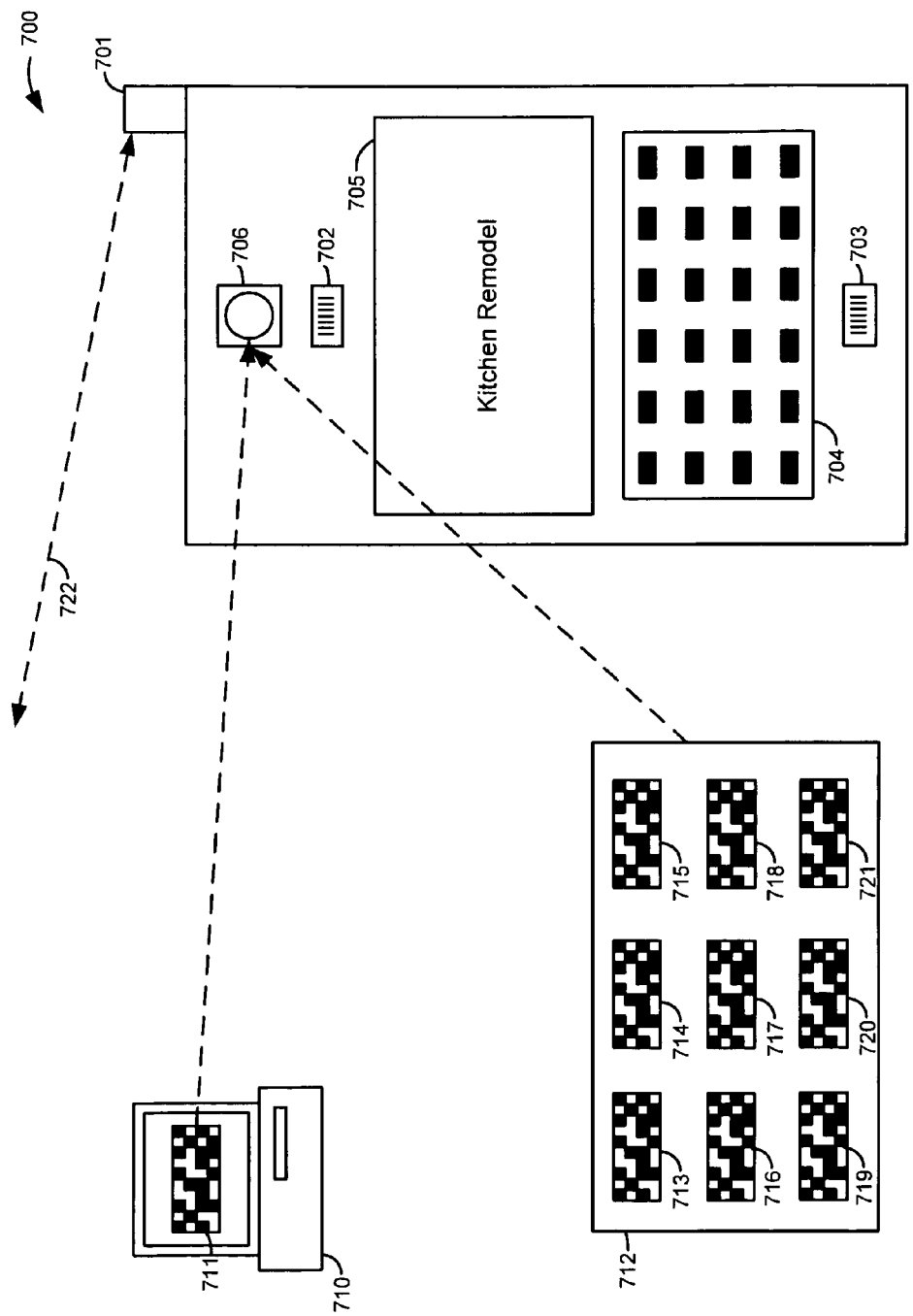
FIG. 7 is a sketch that illustrates a wireless telephone providing image processing in a job assignment context.

FIG. 7 is a sketch that illustrates a wireless telephone providing image processing in a job assignment context. Wireless telephone 700 includes antenna 701, speaker 702, microphone 703, keypad 704, display 705, and camera 706. Wireless telephone 700 communicates with a wireless communication network over wireless link 722. Two-dimensional barcode 711 is displayed on computer monitor 710. Two-dimensional barcodes 713-718 are displayed on card 712.

In this example Joe is a contractor for various home building and renovation projects. He is currently working on a kitchen remodel at one of his customer's homes. Before going home at the end of one work day Joe must set up the subcontractors that will be on the jobsite the following day. He has a computer system set up to keep his jobs organized and on schedule. The computer system is up to date regarding what work needs to be done on the kitchen the following day. Computer monitor 710 displays two-dimensional barcode 711. Two-dimensional barcode 711 encodes processing parameters that indicate that wireless telephone 700 should display "Kitchen Remodel," that two dimensional barcodes 713, 716, and 721 should be processed, and that the information encoded in barcode 713 should be sent via text message to 555-3645, the information encoded in barcode 716 should be sent via text message to 555-9485, and the information encoded in barcode 721 should be sent via email to carlthecarpenter@woodshop.com. The processing parameters further indicate that the address of the home be sent along with the barcode information.

Joe operates wireless telephone 700 to take a picture of two-dimensional barcode 711. Wireless telephone 700 processes two-dimensional barcode 711 to produce corresponding image data having the processing parameters. In accordance with the processing parameters, wireless telephone 700 displays "Kitchen Remodel." Joe knows that card 712 contains the set of two-dimensional barcodes with job information pertaining to kitchen remodels. Joe operates wireless telephone 700 to make a video sweep of two-dimensional barcodes 713-721 on card 712. Two-dimensional barcode 713 encodes that the plumbing for the sink should be installed, two-dimensional barcode 716 encodes that the electricity for the light fixtures should be routed, and two-dimensional barcode 721 encodes that the countertops should be installed. Two-dimensional barcodes 714, 715, and 717-720 encode other projects that either have been or need to be done on the kitchen remodel on other dates. Wireless telephone 700 picks out and processes two-dimensional barcodes 713, 716, and 721 from the video sweep to produce corresponding image data containing the project information in accordance with the processing parameters.

Wireless telephone 700 sends a text message Paul the plumber at 555-3645 stating that the plumbing for the sink should be installed and including the home's address in accordance with the processing parameters. Wireless telephone 700 sends a text message to Earl the electrician at 555-9485 stating that the electricity for the light fixtures should be routed and including the home's address in accordance with the processing parameters. Wireless telephone 700 sends an email to Carl the carpenter at carlthecarpenter@woodshop.com stating that the countertops should be installed and including the home's address in accordance with the processing parameters. Paul, Earl, and Carl now know what their job will be the following day at the kitchen remodel jobsite.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:

optically receiving an image into the wireless communication device, wherein the image encodes processing parameters for a set of images;

processing the optically received image to generate first image data that represents the processing parameters;

processing the first image data to obtain the processing parameters;

optically receiving the set of images into the wireless communication device, wherein the set of images encodes second image data; and processing the optically received set of images based on the processing parameters to obtain the second image data.

2. The method of claim 1 further comprising transmitting the second image data to a URL contained in the processing parameters.

3. The method of claim 1 further comprising decrypting the second image data using a decryption code contained in the processing parameters.

4. The method of claim 1 further comprising executing an application that further processes the second image data, wherein the application is indicated in the processing parameters.

5. The method of claim 1 wherein optically receiving the set of images comprises making a video sweep of the set of images.

6. The method of claim 1 wherein the image is optically received from a computer display.

7. The method of claim 1 wherein processing the optically received set of images based on the processing parameters comprises selecting a subset of the set of images based on the processing parameters and processing only the subset of the set of images to obtain the second image data.

8. The method of claim 7 wherein the processing parameters identify the subset of images.

9. The method of claim 1 wherein the image and set of images comprise one-dimensional barcodes.

10. The method of claim 1 wherein the image and set of images comprise two-dimensional barcodes.

11. A wireless communication device comprising:

a camera configured to optically receive an image that encodes processing parameters for a set of images and to process the optically received image to generate first image data that represents the processing parameters;

a processing system configured to process the image data to obtain the processing parameters;

the camera further configured to optically receive the set of images that encode second image data and to process the optically received set of images based on the processing parameters to obtain the second image data.

12. The wireless communication device of claim 11 further comprising a wireless communication interface configured to transmit the second image data to a URL contained in the processing parameters.

13. The wireless communication device of claim 11 wherein the processing system is further configured to decrypt the second image data using a decryption code contained in the processing parameters.

14. The wireless communication device of claim 11 wherein the processing system is further configured to execute an application that further processes the second image data, wherein the application is indicated in the processing parameters.

15. The wireless communication device of claim 11 wherein the camera is configured to optically receive the set of images by making a video sweep of the set of images.

16. The wireless communication device of claim 11 wherein the image is optically received from a computer display.

17. The wireless communication device of claim 11 wherein the processing parameters direct the camera to select a subset of the set of images and process only the subset of the set of images to obtain the second image data.

18. The wireless communication device of claim 17 wherein the processing parameter identify the subset of images.

19. The wireless communication device of claim 11 wherein the image and set of images comprise one-dimensional barcodes.

20. The wireless communication device of claim 11 wherein the image and set of images comprise two-dimensional barcodes.

* * * * *